United States Patent [19]
Treado

[11] Patent Number: 6,002,476
[45] Date of Patent: Dec. 14, 1999

[54] CHEMICAL IMAGING SYSTEM

[75] Inventor: Patrick Treado, Pittsburgh, Pa.

[73] Assignee: ChemIcon Inc., Pittsburgh, Pa.

[21] Appl. No.: 09/064,347

[22] Filed: Apr. 22, 1998

[51] Int. Cl.[6] ........................................................ G01J 3/44
[52] U.S. Cl. ............................................................. 356/301
[58] Field of Search ..................................... 356/301, 310, 356/326, 328, 330–334

[56] References Cited

U.S. PATENT DOCUMENTS

| 5,194,912 | 3/1993 | Batchelder et al. . |
| 5,442,438 | 8/1995 | Batchelder et al. . |
| 5,528,393 | 6/1996 | Sharp et al. . |
| 5,623,342 | 4/1997 | Baldwin et al. . |
| 5,689,333 | 11/1997 | Batchelder et al. . |

OTHER PUBLICATIONS

Treado et al "A Thousand Points of Light: The Hadamard Transform" Analytical Chemistry 61 (1989) Jun. 1, No. 11, pp. 722–734.
H. Morris, C. Hoyt, P. Miller and P. Treado "Liquid Crystal Tunable Filter Raman Chemical Imaging", vol. 50 *Applied Spectroscopy* No. 6, pp. 805–811 (1996).

Primary Examiner—K. P. Hantis
Attorney, Agent, or Firm—Buchanan Ingersoll, P.C.

[57] ABSTRACT

A Raman chemical imaging system uses a laser illumination source for illuminating an area of a sample. The spectrum of scattered light from the illuminated area of the sample is collected and a collimated beam is produced therefrom. An Evans Split-Element type liquid crystal tunable filter (LCTF) selects a Raman image of the collimated beam. A detector collects the filtered Raman images which are subsequently processed to determine the constituent materials. The Evans Split-Element-type LCTF suitable for high-definition Raman chemical imaging is incorporated into an efficient Raman imaging system that provides significant performance advantages relative to any previous approach to Raman microscopy. The LCTF and associated optical path is physically compact, which accommodates integration of the LCTF within an infinity-corrected optical microscope. The LCTF simultaneously provides diffraction-limited spatial resolution and 9 cm$^{-1}$ spectral bandpass across the full free spectral range of the imaging spectrometer. The LCTF Raman microscope successfully integrates the utility of optical imaging and the analytical capabilities of Raman spectroscopy which has practical significance in materials analysis, including the diagnosis of cancer.

2 Claims, 4 Drawing Sheets

CHEMICAL IMAGING SYSTEM

FIELD OF THE INVENTION

The invention relates to spectroscopic imaging systems in general and Raman chemical imaging systems in particular. The invention also relates to the use of chemical imaging systems in medical diagnosis.

BACKGROUND OF THE INVENTION

Chemical imaging is a new scientific discipline, which combines the chemical analysis power of optical spectroscopy, including Raman, infrared and fluorescence techniques, with high-resolution optical imaging. It has powerful capability for materials characterization, process monitoring, quality control and disease-state determination. This invention relates to a system for obtaining spectroscopically resolved images of materials, including biological samples, using electronically tunable imaging spectrometers employing liquid crystal elements.

Raman and infrared chemical imaging provide molecular-specific image contrast without the use of stains or dyes. Raman and infrared image contrast is derived from a material's intrinsic vibrational spectroscopic signature, which is highly sensitive to the composition and structure of the material and its local chemical environment. As a result, Raman and infrared imaging can be performed with little or no sample preparation and are widely applicable for materials research, failure analysis, process monitoring and clinical diagnostics.

Several approaches to Raman imaging have been demonstrated that employ means to simultaneously record spatial and Raman spectral information. Almost exclusively, modern Raman imaging methods employ multi-channel charge-coupled device (CCD) detection. CCDs are employed to record two dimensions of the three-dimensional information inherent in Raman image data sets. Raman imaging systems can be differentiated by the means they employ to collect the third dimension of information. Raman imaging systems employing dispersive monochromators coupled to CCDs have been devised that rely on two-dimensional point scanning, one-dimensional line scanning, and spatial multiplexing. In addition, Michelson interferometers have been employed in point scanning systems, while a number of tunable filter spectrometers have been described in the past several years.

Of the imaging spectrometers that have been employed for Raman imaging, including liquid crystal tunable filters (LCTFs), acousto-optic tunable filters (AOTFs) and Fabry-Perot filters, LCTFs are the most effective. In general, tunable filter methods employ wide-field laser illumination in combination with multichannel detection. The two spatial dimensions of the image are recorded directly by the CCD camera, while the multispectral information is acquired by capturing images at discrete wavelengths selected by the tunable filter. Under computer control it is possible to collect a data set with a Raman spectrum at each pixel of the image. An advantage of tunable filters is that they provide image fidelity that is limited only by the number of pixels in the camera. As a result, the use of high-definition detectors allows the efficient collection of high-definition images. Prior to the introduction of LCTFs, a key limitation of tunable filters that had handicapped Raman microscopy had been the lack of the availability of tunable filters that simultaneously provided narrow spectral bandpass, broad free spectral range and high image quality. For example, AOTF Raman imaging systems provide high throughput and broad spectral coverage, but AOTFs have distinct limitations. AOTFs suffer from broad spectral bandpass, and imaging performance is degraded appreciably from the diffraction-limited conditions. In effect, AOTFs provide spectral resolution that is an order of magnitude worse than that of a typical Raman spectrometer, and spatial resolution that is approximately 2.5 times worse than the diffraction limit.

A better alternative to the AOTF is the LCTF. In general, LCTFs are electro-optically controllable spectral bandpass filters which can function from the visible to the near-infrared. A number of LCTF designs have been demonstrated for use in multispectral imaging. LCTFs based on the Lyot filter design have been used primarily as red-green-blue (RGB) color filters and fluorescence imaging filters. A nematic LCTF based on the design of the Lyot birefringent filter has been used in a Raman imaging system. The multistage Lyot filter is comprised of a fixed retardance birefringent element and a nematic liquid crystal wave plate placed between parallel linear polarizers. The nematic liquid crystal wave plates incorporated within the Lyot filter act as electronically controlled phase retarders. The LC wave plates can be adjusted over a continuous range of retardance levels, enabling continuous tunability of wavelength. In general, Lyot filters suffer from low peak transmittance. The two main sources of optical loss in the Lyot LCTFs are absorption in the polarizers and imperfect waveplate action arising from the use of simple $\lambda/2$ plates to construct the wide-field retarder stages. An LCTF based on a Fabry-Perot design has been demonstrated for Raman microscopy. However, Fabry-Perot filters suffer from low transmittance, low out of band rejection efficiency, limited free spectral range and low spectral bandpass (25 cm$^{-1}$). In addition, Fabry-Perot filters are susceptible to thermal-induced drift in spectral bandpass unless contained in temperature-controlled housings.

John Evans described a 'split-element' design that addresses the inefficiency of the Lyot design. The 'split-element' design cuts the number of polarizers in half, plus one, reducing the absorbance of light due to the polarizers. In addition, the $\lambda/2$ waveplates are eliminated providing enhanced optical throughput. This yields an improved filter transmission ranging from 1.55–3.1 times that of the Lyot filter.

Unlike other tunable elements for Raman imaging, the LCTF is free of optical distortions, spectral leakage, or image shift with tuning. The first generation (Lyot) LCTFs were designed to operate with green laser excitation and operated only to 650 nm. Evans Split-Element LCTFs operate from 420–720 nm and from 650–1100 nm, as determined by the choice of polarizers. Operation in the red wavelength region has advantages, particularly for the analysis of biological systems. For example, operation in the red wavelength region provides enhanced fluorescence rejection when combined with efficient diode laser sources and takes full advantage of the enhanced red sensitivity of recent generation CCD detectors.

Compared to existing, non-imaging systems, the Raman LCTF system adds the powerful ability to visualize the distribution (morphology and architecture) of chemical species in heterogeneous samples with molecular compositional specificity. Raman images can be collected rapidly, non-invasively, with limited or no sample preparation, at high spatial resolution (<250 nm) and with high fidelity where the spatial fidelity is limited by the number of pixels on the CCD detector. Most importantly, every image pixel has associated with it a Raman spectrum whose quality is comparable to that obtained with conventional non-imaging spectrometers.

Raman is so broadly applicable because most materials exhibit characteristic 'fingerprint' Raman vibrational spectra. Generally accepted practice in performing Raman microscopy is to use non-imaging techniques such as a scanned laser Raman microspot, which yield spectral data but limited (or inefficient) collection of spatial data. Samples exhibiting complex morphologies and well characterized spectral bands are best studied using LCTF technology because of the inherent efficiency of analyzing all spatial channels simultaneously in a massively parallel fashion. The LCTF Raman chemical imaging measurement identifies the presence and/or location of an analyte species in a sample by imaging at the characteristic analyte Raman spectral bands. In general, it is not necessary to have a complete Raman spectrum at each image pixel in order to obtain meaningful and chemically relevant image contrast. This is especially due in part to the redundancy of a typical Raman spectrum. Often only several regions of the spectrum are needed to generate analyte-specific image contrast. The Evans Split-Element LCTF represents a breakthrough technology because it provides spectral resolution comparable to a single stage dispersive monochromator while also providing diffraction-limited spatial resolution. This performance is provided without moving mechanical parts in a computer controlled device which allows automated operation.

Cancer is a major cause of death worldwide. Early definitive detection and classification of cancerous growths is often crucial to successful treatment of this disease. Currently, several biopsy techniques are used as diagnostic methods after cancerous lesions are identified. In the case of breast cancer, lesions are typically identified with mammography or self breast exam. The most reliable method of diagnosis is examination of macroscopic-sized lesions. Macroanalysis is performed in conjunction with microscopic evaluation of paraffin-embedded biopsied tissue which is thin-sectioned to reveal microscale morphology.

The detection and diagnosis of cancer is typically accomplished through the use of optical microscopy. A tissue biopsy is obtained from a patient and that tissue is sectioned and stained. The prepared tissue is then analyzed by a trained oncologist who can differentiate between normal, malignant and benign tissue based on tissue morphology. Because of the tissue preparation required, this process is relatively slow. Moreover, the differentiation made by the oncologist is based on subtle morphological differences between normal, malignant and benign tissue based on tissue morphology. For this reason, there is a need for an imaging device that can rapidly and quantitively diagnose malignant and benign tissue.

Alternatives to traditional surgical biopsy include fine needle aspiration cytology and needle biopsy. These non-surgical techniques are becoming more prevalent as breast cancer diagnostic techniques because they are less invasive than biopsy techniques that harvest relatively large tissue masses. Fine needle aspiration cytology has the advantage of being a rapid, minimally invasive, non-surgical technique that retrieves isolated cells that are often adequate for evaluation of disease state. However, in fine needle biopsies intact breast tissue morphology is disrupted often leaving only cellular structure for analysis which is often less revealing of disease state. In contrast, needle biopsies use a much larger gauge needle which retrieve intact tissue samples that are better suited to morphology analysis. However, needle biopsies necessitate an outpatient surgical procedure and the resulting needle core sample must be embedded or frozen prior to analysis.

A variety of "optical biopsy" techniques have potential as non-invasive, highly sensitive approaches that will augment, or even be alternatives to current diagnostic methods for early detection of cancer, including breast cancer. Optical biopsies employ optical spectroscopy to non-invasively probe suspect tissue regions in situ, without extensive sample preparation. Diagnostic information is provided by the resultant spectroscopically unique signatures that allow differentiation of normal and abnormal tissues. One biodiagnostic technique is fluorescence optical biopsy. Due to the nonspecific nature of tissue autofluorescence and the need to add staining agents to augment the specificity of fluorescence approaches, this technique has limitations.

In contrast to other techniques, Raman spectroscopy holds promise as an optical biopsy technique that is anticipated to be broadly applicable for characterization of a variety of cancerous disease states. A number of researchers have shown that Raman spectroscopy has utility in differentiating normal vs. malignant tissue and differentiating normal vs. benign tissue. In general, the Raman spectra of malignant and benign tissues show an increase in protein content and a decrease in lipid content versus normal breast tissue, demonstrating that cancer disease states have a molecular basis for their origin.

However, difficulties exist when trying to use Raman spectroscopy alone to differentiate benign vs. malignant tissues due to the spectral similarities of these tissue types. In addition, Raman spectroscopy of breast tissue samples requires large numbers of cell populations. If only a small portion of the cells are cancerous, as in the early stages of lesion development, then Raman spectroscopy will be insensitive to the disease. It would be advantageous to have a technique capable of the spatial sensitivity needed for discrimination of cancerous from normal cells in early stage breast cancer diagnosis.

Chemical imaging based on optical spectroscopy, in particular Raman spectroscopy, provides the clinician with important information. Chemical imaging simultaneously provides image information on the size, shape and distribution (the image morphology) of molecular chemical species present within the sample. By utilizing molecular-specific imaging, based on chemical imaging, the trained clinician can make a determination on the disease-state of a tissue or cellular sample based on recognizable changes in morphology without the need for sample staining or modification.

SUMMARY OF THE INVENTION

A Raman chemical imaging system is provided which can be used to make a rapid, quantitative cancer diagnosis that is applicable to histopathology and in vivo applications. In the system, a sample is obtained from the patient through traditional biopsy procedures. A laser illumination source, coupled via directly beaming the laser into the entrance aperture of the system or via a fiber optic, illuminates an area of the sample to be diagnosed. An objective collects an image of scattered light from the illuminated area of the sample and produces a beam therefrom. An Evans Split-Element liquid crystal tunable filter selects a Raman image of the beam. A detector collects the filtered Raman images which are then processed to determine quantitatively whether the Raman images conform to normal, malignant or benign tissues and cells.

In this method, the processor compares the Raman spectra at each Raman image pixel with a library of Raman spectra stored for healthy tissue and cancerous tissue. The processor selects the closest match between the Raman image and the library of Raman spectra. The processor then produces an image of the tissue sample from said selected matches.

An objective of this invention is to provide an LCTF suitable for Raman imaging which can readily and rapidly distinguish between various materials. The LCTF, an Evans Split-Element-type filter, provides diffraction-limited spatial resolution and spectral resolution that is comparable to that provided by a dispersive Raman monochromator. The Evans Split-Element-type LCTF provides high out-of-band rejection, broad free spectral range, high peak transmittance, and highly reproducible computer-controlled tuning.

DETAILED DESCRIPTION OF PREFERRED EMBODIMENTS

In Raman spectroscopy, laser light induces a scattering effect of the sample. Chemical composition and structure are determined by the light emitted by the sample. Typical data is output as intensity values at wavelengths in a predefined range.

In Raman chemical imaging, Raman spectroscopy is combined with imaging processes. Light intensity is recorded as a function of both wavelength and location. The image domain contains the full image at each individual wavelength. The spectroscopy domain contains the fully resolved spectrum at each individual pixel. As a result of Raman chemical imaging, both structural and compositional information can be determined consistently.

Figure 1:
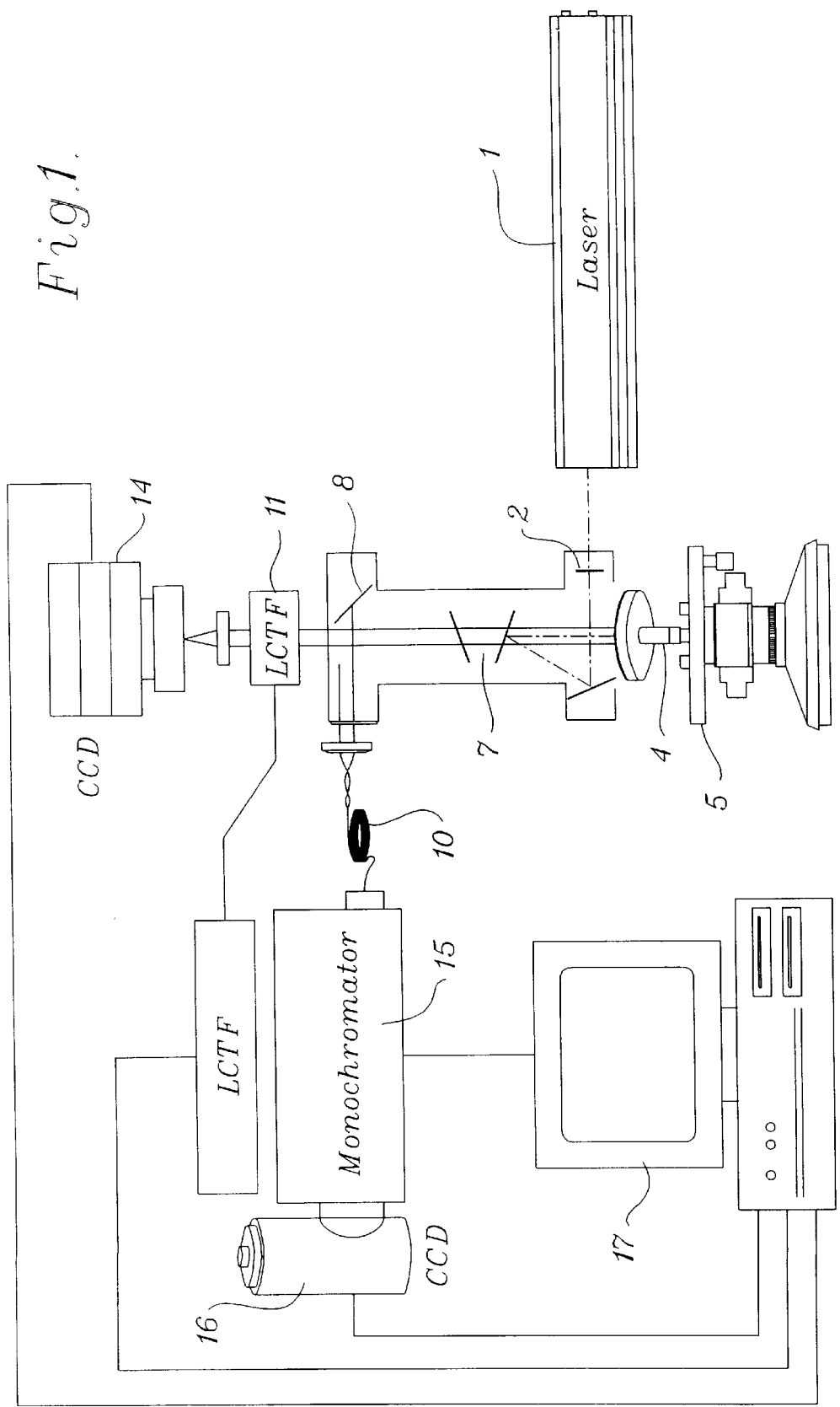
FIG. 1 is a schematic diagram of a presently preferred embodiment of the Raman chemical imaging system of the present invention.

FIG. 1 is a schematic diagram of the LCTF Raman chemical imaging system. Laser epi-illumination is provided by a laser 1, such as a Spectra Physics Millenia II Nd:YVO$_4$ laser, beamed directly into the microscope or imaging optic. Alternatively, the laser light is coupled via optical fiber to the imaging optic 5, such as an infinity-corrected Olympus BX60 microscope. A bandpass filter 2 such as a dielectric bandpass filter, efficiently removes SiO$_2$ Raman bands that arise from the laser excitation fiber optic. The laser light is directed to a bandreject optical filter 7 optimized for oblique illumination at 7° relative to normal incidence. The reflected light propagates through an imaging optic 4 and illuminates the sample 5. The Raman emission is collected with the same objective and is transmitted through the notch filter which rejects light at the laser wavelength. A second notch filter is positioned after the first filter and provides additional rejection of the laser source.

Confocal Raman point microspectroscopy is performed by employing a swing away mirror 8 placed before the LCTF to redirect the Raman emission to a fiber-optic 10. The other end of the fiber is configured in a linear geometry and is focused on the entrance slit of a spectrograph 15. The Raman spectrum is collected with a CCD detector located at the exit focal plane of the spectrometer 16.

In imaging mode, the magnified Raman image is coupled through the Evans Split-Element LCTF 11 and collected on a high dynamic range, cooled charge-coupled device (CCD) detector 14.

The LCTF Split-Element design includes a high-order fixed retarder of thickness D, having retardance $R_h$, constructed as two elements of thickness D/2, with their fast and slow axes crossed. A low-order retarder of retardance $R_1$ is interposed with its fast axis at 45° to that of the D/2 elements. Each retarder has an associated liquid crystal tuning element. Such an assembly, placed between suitably oriented crossed polarizers, has a transmission of $$T(\lambda)=\sin^2(\pi R_1/\lambda)\times\sin^2(\pi R_h/\lambda).$$

The split-element stage is equivalent in its spectral performance to two Lyot stages. By constructing the LCTF as groups of split-element stages, one collapses an N-stage Lyot filter into N/2 split-element Lyot stages, and reduces the number of polarizers by N/2. The reduction of polarizers is compensated by the increased number of liquid crystal tuning elements which enhance the overall optical throughput.

A processing unit 17, typically a Pentium computer, is used for Raman image collection and processing. The CCD detector 14 is operated with commercial software, such as ChemIcon, ChemImage.

Every material has a characteristic "fingerprint" based on molecular composition. For this reason, the ability of the Raman chemical imaging system to measure quantitative responses of analyzed materials renders it suitable for a variety of purposes. For example, Raman imaging systems can be used to detect metal corrosion, determine polymer architecture and molecular composition. In addition, the Raman chemical imaging system can also be used in pathology analysis wherein the molecular specificity of Raman imaging provides a mechanism for the diagnostic evaluation of tissue.

Because Raman spectroscopy can readily detect the characteristic "fingerprint" of discrete molecular compositions, it has the potential to make histopathology analysis more quantitative. Using traditional Raman spectroscopy, the differences between normal tissue and legions, such as lipids and proteins, can be readily determined based on the Raman spectrum. However, traditional Raman spectroscopy is unable to distinguish between benign and malignant tissue. However, the use of a Evans Split-Element LCTF provides the ability to distinguish between normal tissue, malignant tissue and benign tissue.

Figure 2:
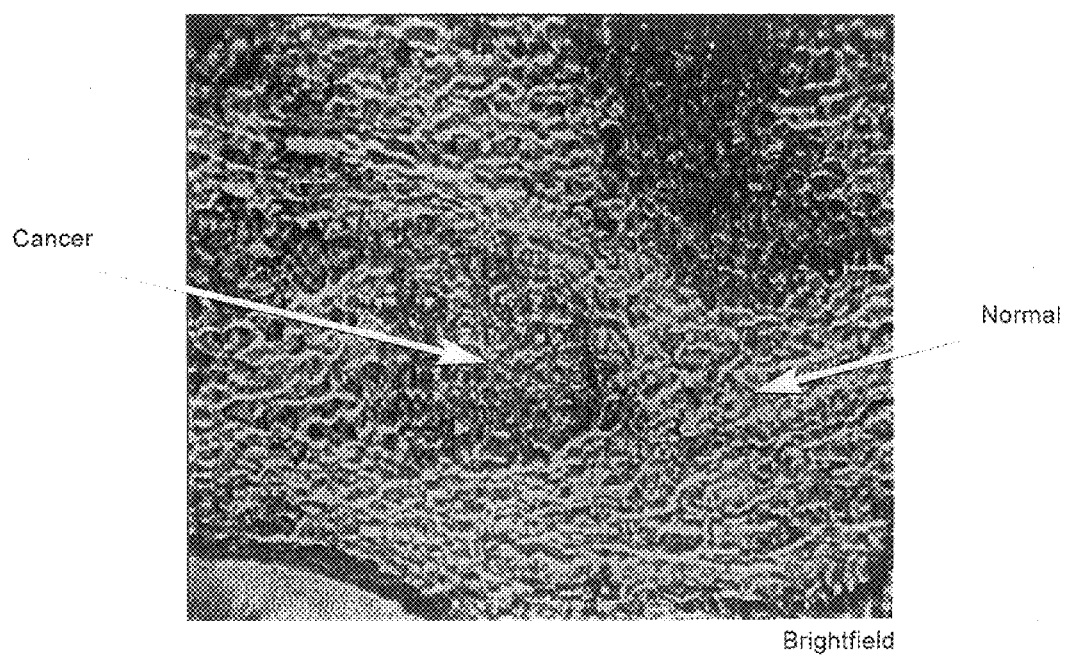
FIG. 2 is a brightfield image of a human tissue biopsy thin section.

The optimized LCTF Raman microscope provides high spatial and spectral resolution. The image quality of the LCTF is shown in FIG. 2, a brightfield image of a human tissue biopsy sample. FIG. 2 is collected with the LCTF in the optical path and fine morphological details of the tissue sample, including individual cellular components, are observable. Malignant breast cells are visible in the left portion of the image. Normal breast cells are visible in the right portion of the image.

Figure 3:
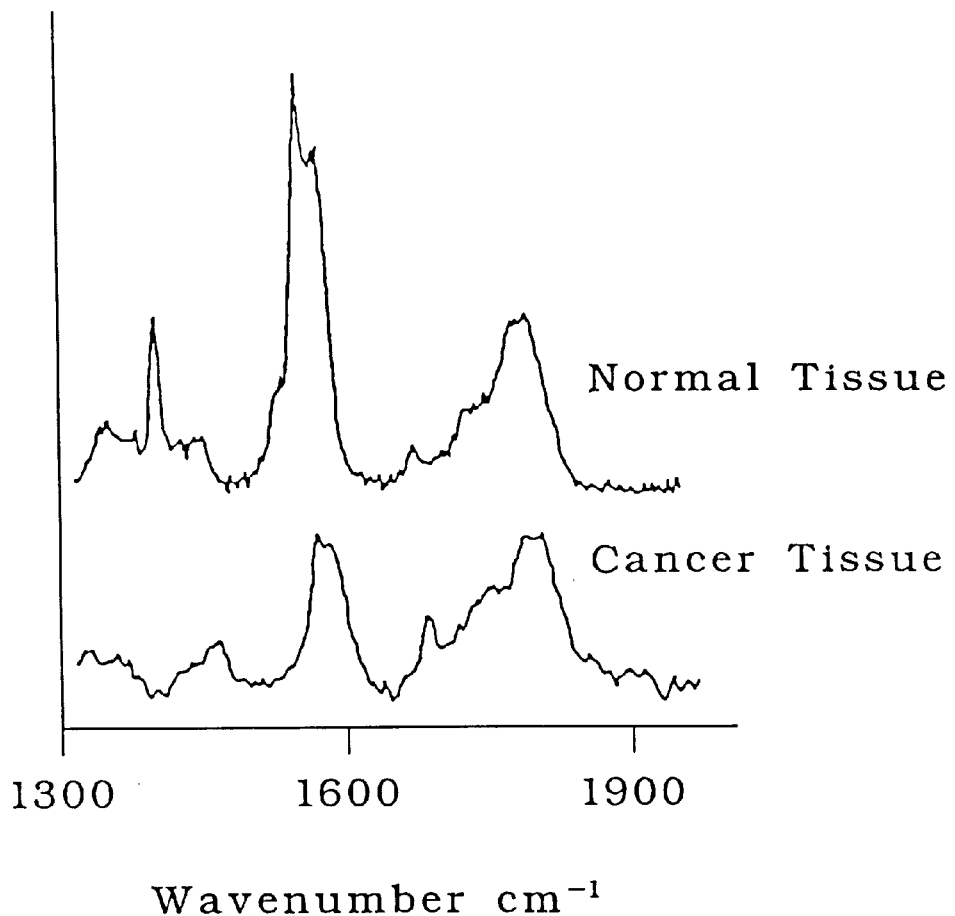
FIG. 3 shows Raman spectra of normal tissue and malignant cancer tissue.

FIG. 3 shows the spectra of normal tissue and malignant cancerous tissue. The spectra were collected by coupling the Raman scatter from discrete sample regions (normal or diseased) to the dispersive Raman spectrometer via fiber optics. FIG. 3 shows that the differences between the spectra of normal tissue and benign and malignant cancerous tissue which can be distinguished using Raman spectroscopy. In particular, differences in the lipid Raman band at 1445 cm$^{-1}$ are observable due to the decrease in the relative amount of lipid.

Figure 4A:
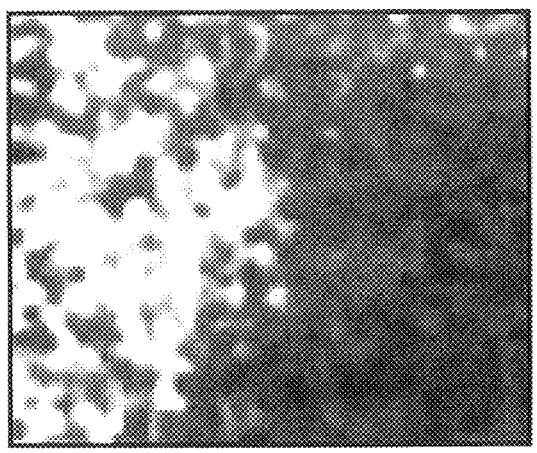
FIGS. 4a–4b are Raman images of the same human tissue biopsy of FIG. 2 collected with the Raman chemical imaging system of the present invention using an Evans Split-Element LCTF. 4A shows a Raman image of cancerous cells within the breast tissue biopsy. 4B shows a Raman image of normal cells within the breast tissue biopsy.
Figure 4B:
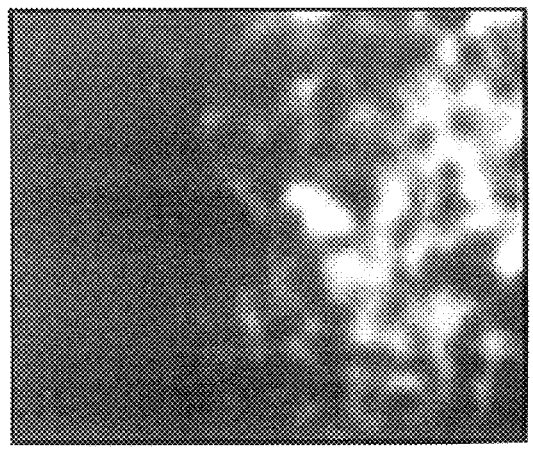

FIG. 4 are Raman images of the same human tissue biopsy of FIG. 2 collected with the LCTF. The images are collected by tuning the LCTF from 1200 to 1800 cm$^{-1}$ and capturing images at discrete intervals. The image data set is then processed using multivariate image analysis routines that classify the image pixels which are linearly independent Raman spectra by their similarity to a library spectrum of normal or diseased material. The Raman image of FIG. 4 (left) distinguishes the malignant cancer tissue of the sample. The Raman image of FIG. 4 (right) distinguishes the normal cancer tissue of the sample. The Raman image in FIG. 4 is unparalleled in Raman imaging and was collected in 10 minutes.

The advantage of LCTF technology over competitive approaches is the ability to simultaneously collect high spectral/spatial information. The benefit is best realized in the analysis of multicomponent heterogeneous systems, where having a high-quality Raman spectrum at each pixel of the image makes the analysis of complex matrices less subjective and based primarily on quantitative parameters. From the high-quality spectra, sample composition and quantitation has been demonstrated. In this manner, the present Raman chemical imaging system can be used to provide a diagnosis of cancer or other pathology determinations. As a result, specific outcomes are anticipated, including: (1) real-time diagnosis of suspicious lesions sites identified through self-breast exam and/or mammography that are made accessible via needle core biopsy; (2) immediate feedback to the clinician as to the severity of the clinical situation with results being communicated to the patient upon completion of Raman biopsy; (3) potential information on prognostic indicators of disease such as growth rate through quantitative evaluation of cellular nucleic acid composition; (4) minimal patient discomfort; (5) no cosmetic defect of the breast; and (6) reduced exposure to ionizing radiation (x-rays) through overall reduction in use of mammography for lesion screening.

Although present preferred embodiments of the invention have been shown and described, it should be distinctly understood that the invention is not limited thereto but may be variously embodied within the scope of the following claims.

I claim:

1. A chemical imaging system comprising:

(a) a laser illumination source for illuminating an area of a sample;

(b) an objective for collecting a Raman spectrum of scattered light from said illuminated area of said sample and producing a collimated beam therefrom;

(c) a liquid crystal tunable filter for selecting a Raman chemical image of said collimated beam and producing a filtered Raman chemical image therefrom, said filter being an Evans Split-Element liquid crystal tunable filter; and (d) detector for collecting said filtered Raman chemical image.

2. The system of claim 1 further comprising processing means for producing a Raman chemical image of said sample.

* * * * *

UNITED STATES PATENT AND TRADEMARK OFFICE
CERTIFICATE OF CORRECTION

PATENT NO. : 6,002,476  
APPLICATION NO. : 09/064347  
DATED : December 14, 1999  
INVENTOR(S) : Patrick Treado Page 1 of 1

It is certified that error appears in the above-identified patent and that said Letters Patent is hereby corrected as shown below:

In the specification, column 5, line 45, for the reference numerical referring to the imaging optic, replace "5" with --4--.

Signed and Sealed this

Eighteenth Day of November, 2008

JON W. DUDAS  
*Director of the United States Patent and Trademark Office*